(12) United States Patent
Kamaraju et al.

(10) Patent No.: US 11,790,025 B2
(45) Date of Patent: Oct. 17, 2023

(54) EXTRACTING DATA AND METADATA FROM IDENTIFICATION LABELS USING NATURAL LANGUAGE PROCESSING

(71) Applicant: STREEM, LLC, Portland, OR (US)

(72) Inventors: Pavan K. Kamaraju, London (GB); Ghislain Fouodji Tasse, London (GB); Flora Ponjou Tasse, London (GB); Sean M. Adkinson, North Plains, OR (US); Ryan R. Fink, Ridgefield, WA (US)

(73) Assignee: STREEM, LLC, Portland, OR (US)

(*) Notice: Subject to any disclaimer, the term of this patent is extended or adjusted under 35 U.S.C. 154(b) by 92 days.

(21) Appl. No.: 17/217,892

(22) Filed: Mar. 30, 2021

(65) Prior Publication Data

US 2022/0318322 A1 Oct. 6, 2022

(51) Int. Cl.
| | | |
|---|---|---|
| *G06F 16/95* | (2019.01) | |
| *G06F 16/955* | (2019.01) | |
| *G06F 40/40* | (2020.01) | |
| *G06V 20/20* | (2022.01) | |
| *G06V 30/10* | (2022.01) | |
| *G06F 18/214* | (2023.01) | |
| *G06V 30/19* | (2022.01) | |

(52) U.S. Cl.
CPC .......... *G06F 16/955* (2019.01); *G06F 18/214* (2023.01); *G06F 40/40* (2020.01); *G06V 20/20* (2022.01); *G06V 30/10* (2022.01); *G06V 30/19147* (2022.01)

(58) Field of Classification Search
CPC ..... G06F 16/955; G06F 40/40; G06K 9/6256; G06V 20/20; G06V 30/10
See application file for complete search history.

(56) References Cited

U.S. PATENT DOCUMENTS

2020/0193203 A1* 6/2020 Fink .................. G06Q 10/20
2021/0271636 A1* 9/2021 Watanabe ............ G06F 16/353

OTHER PUBLICATIONS

Chen et al. "Integrating natural language processing with image document analysis: what we learned from two real-world applications", International Journal on Document Analysis and Recognition (IJDAR) vol. 18, pp. 235-247 (2015) (Year: 2015).*

* cited by examiner

*Primary Examiner* — Qian Yang
(74) *Attorney, Agent, or Firm* — Schwabe Williamson & Wyatt

(57) ABSTRACT

Methods and systems disclosed herein are directed to detection and recognition of items of data on labels applied to equipment and identifying metadata labels for the items of data using NLP. Embodiments may include identifying one or more items of data on an image of a label associated with a piece of equipment, determining, using NLP on the one or more items of data of the image, one or more metadata associated, respectively, with the identified one or more items of data, and outputting at least one of the one or more metadata and associated items of data.

20 Claims, 7 Drawing Sheets

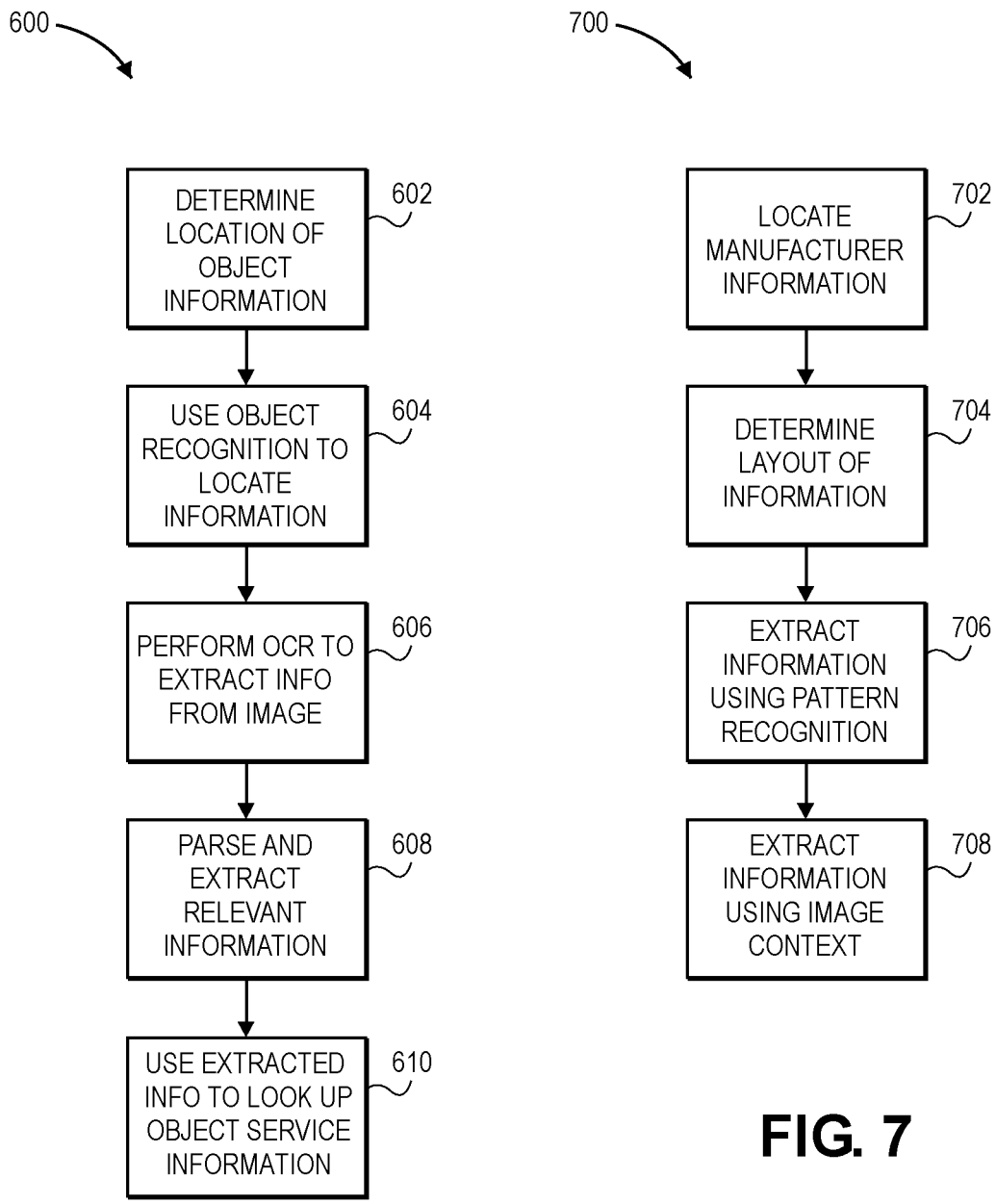

NON-TRANSITORY COMPUTER-READABLE STORAGE MEDIUM
902

PROGRAMMING INSTRUCTIONS 904
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 9

EXTRACTING DATA AND METADATA FROM IDENTIFICATION LABELS USING NATURAL LANGUAGE PROCESSING

TECHNICAL FIELD

The present disclosure relates to the field of augmented reality (AR), and specifically to detection and recognition of visual tags on various objects.

BACKGROUND

While various products such as appliances, cars, instruments, electronic devices, and other consumer goods may define a class of good, e.g. dishwashers, trucks, phones, and tablets, there are often a number of different manufacturers of goods offering a variety of different makes and models for a given class of product. For example, GE and Whirlpool may both manufacture dishwashers that differ from each other. Further, a given manufacturer often offers a variety of different models of a given product. Apple manufactures several different models of iPads, iPhones, Mac Books, and similar products. GE manufactures a variety of different dishwashers with various specifications, e.g. the Adora® line and the Profile® line, to name a few. While different models of a product may share many common components, e.g. doors, motors, agitators, racks, etc., models may vary in a variety of ways, such as other components, assembly and disassembly steps, tuning parameters, calibration steps, and other unique aspects.

Devices such as smartphones and tablets are typically capable of capturing images and/or video and performing various types of processing upon the images. Such processing may include object recognition, which can further include optical character recognition (OCR) for detecting text in captured images and/or video. One or more recognized objects and, in particular, detected text can further be used as input to a database or on-line search to locate additional information related to the recognized objects or text.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 6 is a flowchart of an example method for recognizing and extracting model information from an image or video of a device that may be performed by the system of FIG. 1, according to various embodiments.

FIG. 7 is a flowchart of an example method for determining relevant information from an image or video of device model information that may be performed as part of the method of FIG. 2, according to various embodiments.

FIG. 9 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
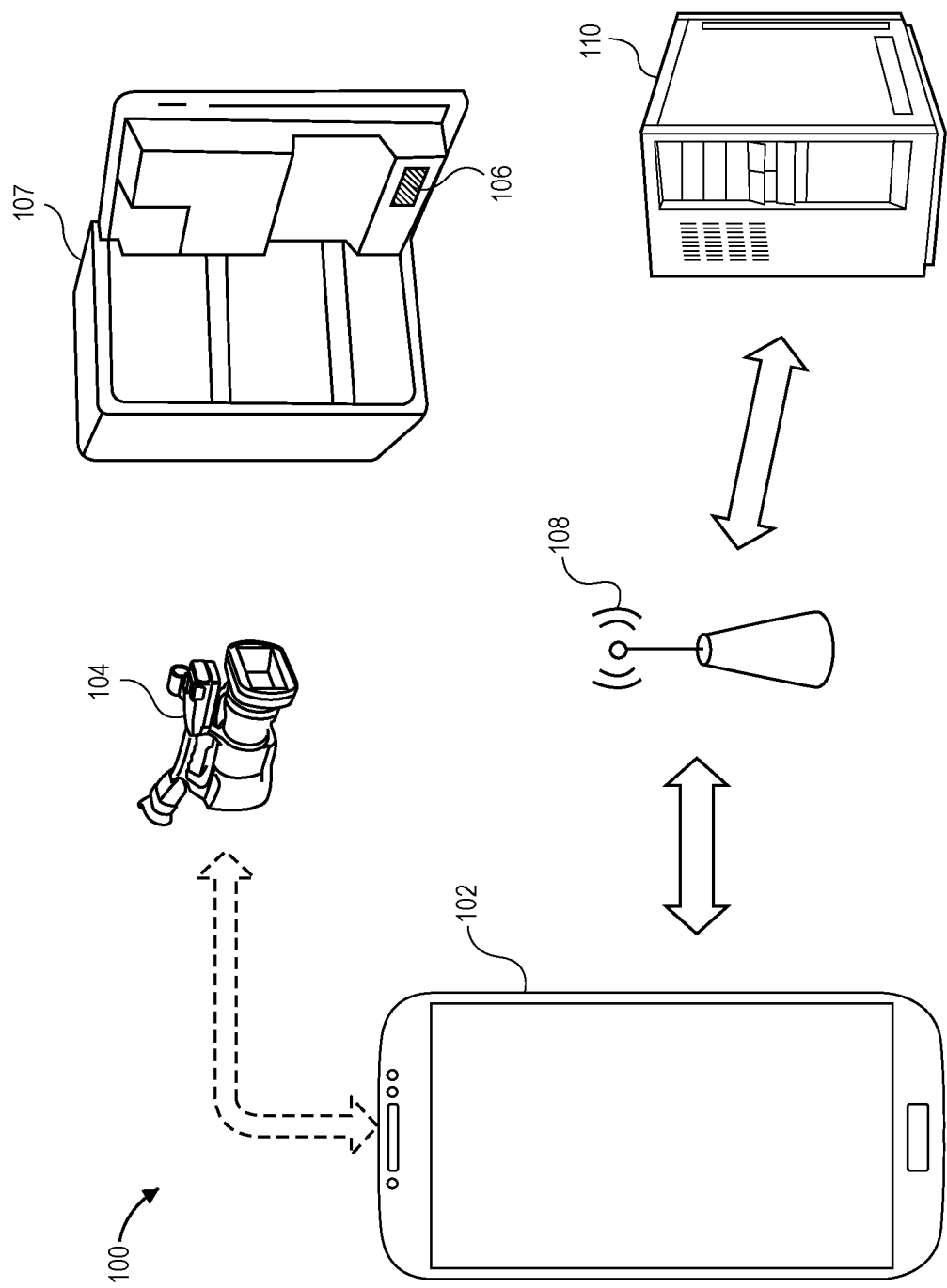
FIG. 1 illustrates a block diagram of the components of an example system for recognizing and extracting information from an image or video of an identification label on a device, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As devices may vary in construction from model to model, it is important that the specifics of a given device's construction, operation, and, particularly to a person who may service the device, the steps required to properly repair the device are known. Without such knowledge, a user may be unable to successfully operate the device or, worse, may inadvertently damage the device; similarly, a device repair may be performed improperly or, worse, may result in further damage to the device.

Manufacturers may make service instructions available to allow for proper repair and servicing of devices they sell. However, locating the correct repair and/or service information often requires knowledge of a particular device's make and model information. Further still, devices of a given make and model may have changed over time as manufacturing techniques are refined, parts suppliers change, and/or internal device configurations are changed or refined. In such a scenario, obtaining the necessary repair information may require knowing not only the device's make and model, but also serial number, which can be used to look up and retrieve the correct information. Typically, manufacturers affix make, model, serial number, and other information relevant to the device in an inconspicuous location, such as the back or bottom of a device. For larger appliances, this information may be provided on a label, sticker, plate, or tag, which may be affixed on the inside of a door, in a door frame, on a sidewall of an interior cavity, on the back or exterior side of a device, or another suitable location that is reasonably accessible, but does not otherwise interfere with the appearance and/or function of the device.

In the embodiments disclosed herein, internet-connected devices such as smartphones and tablets can be configured to analyze images or videos using object detection and/or optical character recognition (OCR) algorithms. For example, apps are available for smartphones and tablets that allow the device to capture an image or video that contains text, identify the location of the text within the image frame, and perform OCR upon the recognized text to extract the actual text. This text can then be used as input to a search engine or database, or other application. As discussed herein, this text may be provided to a natural language processing (NLP) component that may be trained to recognize the text and to associate the recognized text with one or more metadata. For example, a first text value may be identified as a serial number, and a second text value may be identified as a model number. The identification of these two text values may be independent of their positioning or their relationship within the image or video. In other embodiments, fewer or more text values may be processed, depending upon the specifics of a given tag and/or desired or required service for a given appliance or other device. In still other embodiments, non-textual information may be extracted, such as symbols, diagrams, or logos, where such information is relevant to providing service for a given device.

The text and metadata identified using NLP may then be used in conjunction with a video chat session with a service professional to provide an owner of the device or appliance to be serviced the correct instructions for servicing the device or appliance. In some embodiments, the identified text may be used to help select an appropriate service professional with expertise relevant to the identified text. Similarly, the identified text and metadata can be used to locate and retrieve operational information, such as a product manual or on-line help. Still further, the text and metadata could be used to retrieve on-line or other relevant resources such as videos or websites related to the product, e.g. crowd-sourced information such as on-line tutorials provided by other users of the device, the website of the device manufacturer, online forums for device owners, etc.

FIG. 1 illustrates an example system 100 for automatic detection and recognition of visual tags, such as product or appliance model and serial number information. System 100 may include a consumer device 102. In the depicted embodiment of FIG. 1, consumer device 102 is a smartphone, which may be implemented as a computer device 800, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein.

Consumer device 102 may further include a camera 104, which may be integrated into consumer device 102 or otherwise attached or in data communication with consumer device 102. Camera 104 may be any camera that can provide a suitable image or video stream for the intended purpose of consumer device 102. Where consumer device 102 is implemented as a smartphone or tablet, camera 104 may be a built-in camera. In other embodiments, such as where consumer device 102 is a laptop, camera 104 may be built in or a separate, external unit. A suitable image may be captured to any suitable file type, e.g. PNG, GIF, JPEG, BMP, TIFF, or another suitable image format, which may be compressed or uncompressed, and may utilize a lossless or lossy encoding scheme. A suitable video stream may be a digital video stream, and may be compressed in embodiments with some form of video compression, such as AVC-HD, H.264, MPEG-4, or another suitable compression scheme. In other embodiments, the image or video stream may be captured to a proprietary format, such as a format specific to consumer device 102, suitable for internal processing, or specific to be processed by another device in system 100. Camera 104 may be configured to output standard or high-definition video, 4K video, or another resolution of video suitable for the intended purpose of camera 104 and consumer device 102.

In the depicted embodiments, consumer device 102 may capture a picture or video using camera 104 of equipment information 106, for example a label, affixed to a piece of equipment 107, for example, a refrigerator. Equipment information 106 may be secured to, imprinted upon, or otherwise associated with a piece of equipment 107 that a user of system 100 may intend to service. As discussed above, equipment information 106 may include various data about the associated piece of equipment, including manufacturer name and information, model information, serial number, manufacture date, place of origin, operating specifications, and any other pertinent information that may be usable when servicing the associated piece of equipment. Such data may be presented in either a human readable format, a machine readable format (e.g. bar code, QR code, RFID tag, or similar structure), or a combination of both.

Consumer device 102, in embodiments, includes network communication functionality, such as a wired or wireless network interface for connecting to a network 108, depicted here as a wireless transceiver. Such network communications may be implemented using any suitable technology, such as WiFi, Bluetooth, or cellular technologies including 3G, 4G/LTE, 5G, or any other suitable wireless communications protocols now known or later developed. Wired communications may include Ethernet, or a serial interface such as USB, or another suitable wired communication protocol now known or later developed.

Consumer device 102, in some embodiments, may communicate with a central server 110, via network 108. Central server 110 may be located remote from consumer device 102, and in some embodiments may be implemented as a cloud or distributed service. In other embodiments, central server 110 may be a private server, such as may be owned by an organization that also owns consumer device 102.

Network 108, in embodiments, may comprise the Internet, at least partially, or may comprise a local area network, a wide area network, a metropolitan area network, or some combination of any of the foregoing. Central server 110 may provide at least some of the functionality required to implement the methods described below. Central server 110 may be operated by a third party, unrelated to the operator of consumer device 102 (e.g. when central server 110 is provided via a cloud service), and may accordingly offer services implementing the methods described herein to subscribers, such as a user of consumer device 102. Further still, although not depicted, central server 110 may act to facilitate communications between a user of consumer device 102 and a third party, such as a technician or service person. The third party may further be able to send and receive data to/from consumer device 102 via central server 110.

Central server 110, in some embodiments, includes a database or databases of various objects, such as appliances, consumer electronics, other equipment, etc., that may be used in conjunction with method 600 (FIG. 6, discussed below) for performing recognition of visual tags, or may be used in conjunction with method 400 (FIG. 4, discussed below) to provide NLP-based identification of data and metadata associated with the data. In other embodiments, central server 110 may rely upon search functions, such as Google®, or other Internet-accessible search engines, to supply any information needed to help carry out the various steps of example methods 400 or 600. In still other embodiments, central server 110 may use a combination of a local database and Internet-accessible resources. For example, central server 110 may include high-level information about various objects and then rely upon Internet resources to obtain additional information, or may include comprehensive information about commonly found objects, and rely upon Internet resources to obtain information about relatively more obscure objects. In other embodiments, a combination of any of the foregoing may be used.

It should be understood that the configuration and components depicted in system 100 of FIG. 1 are only one possible configuration. Other embodiments may have consumer device 102 communicate with other components across network 108, or may directly communicate with a server, such as central server 110, directly, without using network 108. Still other embodiments may have consumer device 102 communicate with service providers directly, either via initial contact or via central server 110. Central server 110 may then hand off communications so that consumer device 102 communicates directly with a service provider.

Figure 2:
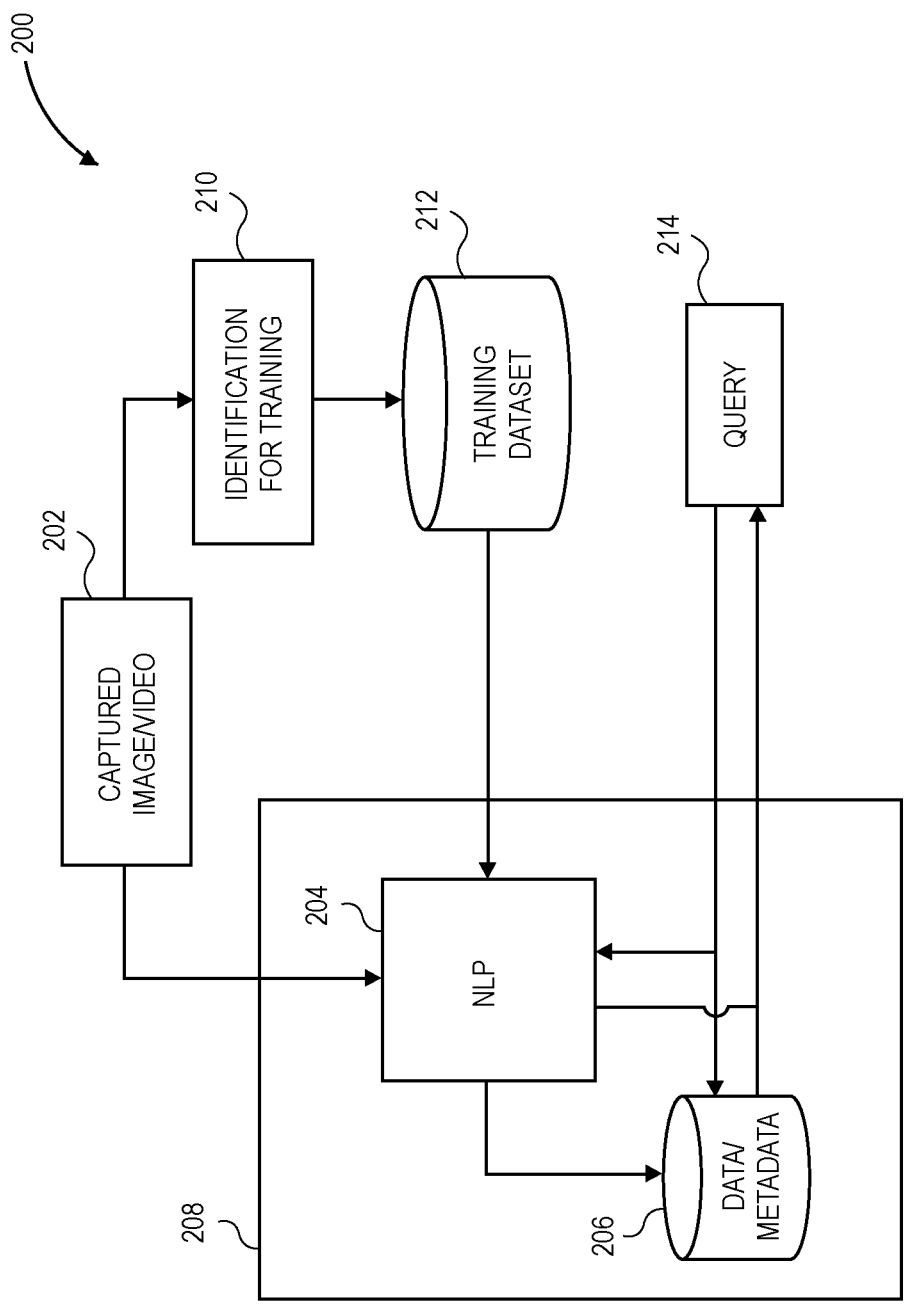
FIG. 2 illustrates a block diagram of functional components of an example system for using natural language processing (NLP) to identify fields of information from an image or video of an identification label on a device, according to various embodiments.

FIG. 2 illustrates a block diagram of functional components of an example system 200 for using NLP to identify fields of information from an image or video of an identification label on a device, according to various embodiments. NLP techniques allow a computer to build an understanding of the contents of various documents including contextual nuances of text and graphics devices, in particular with respect to equipment information 106. In embodiments, the natural language processor (NLP) 204 may be trained using a training dataset 212 as discussed further below.

In embodiments, the various components shown for system 200 may be implemented in the consumer device 102 and/or the central server 110. In embodiments, other devices may be used that may perform one or more of the techniques or functions of the various components for system 200. In embodiments, these other devices may be implemented in the cloud. In other embodiments, these other devices may include a device or devices under the control of or used by a service provider, which may be in contact with consumer device 102, either via central server 110 or directly.

In embodiments, a captured image/video 202 may include images or video captured using camera 104 to capture equipment information 106 of piece of equipment 107 of FIG. 1. The captured image/video 202 may be sent to NLP 204 that may process the captured image/video 202 in order to produce data, as well as metadata associated with the data, related to the piece of equipment 107. In embodiments, an OCR process may be applied to the captured image/video 202 to identify text of the equipment information 106. In embodiments, this OCR process may be a part of the NLP 204, or may be separately performed and sent to the NLP 204 for processing. In embodiments, other information in addition to the identified text may also be sent to the NLP 204, such as a graphics device or a logo, as discussed in greater detail with respect to FIG. 3.

Examples of metadata associated with data may include, but are not limited to, with respect to a piece of equipment. In non-limiting examples, metadata may include "serial number," "model number," "part number," "rating" such as a quality rating or Underwriters Laboratory (UL) rating, "manufacturing date," "manufacturing location," "installation instructions," "operating instructions," "dimensions," "weight," and/or "power requirements" of the piece of equipment. In embodiments, metadata may also be referred to as categories.

In embodiments, after the NLP 204 has received the captured image/video 202, the NLP 204 identifies resulting data and one or more pieces of metadata associated with that data, based on NLP techniques. These NLP techniques may be readily known in the art. This resulting data and one or more pieces of metadata may be stored in a data/metadata database 206 for later retrieval, or may be displayed, for example, on the user device 102.

For example, the NLP techniques may determine, based on an image, that a first data field on the equipment label 106 may be a serial number, a second data field on the equipment label 106 may be a model number, and a third data field on the equipment label 106 may be a manufacturing date. In this example, "serial number," "model number," and "manufacturing date" are metadata associated, respectively, with the first data field, the second data field, and the third data field, and may be stored in the data/metadata database 206.

In embodiments, the NLP 204 and the data/metadata database 206 may be included in a computing environment 208, for example in the consumer device 102 or the central server 110. In embodiments, the data/metadata database 206 may be outside of the computing environment 208 and included in a cloud or on another hosted platform. In embodiments, NLP 204 is built upon artificial intelligence (AI) techniques that train computers to emulate human tasks through learning and automation. In this way, NLP 204 learns from experience, adjusts to new inputs, and accomplishes specific tasks, for example recognizing metadata and its associated data, without manual interventions. In embodiments, NLP 204 may be implemented in conjunction with an AI system, and may be implemented in hardware (non-limiting examples including Apple™ A-series or M-series processors), software, or a combination of both.

In embodiments, the NLP 204 may be trained using a training dataset 212. Training may also be augmented with artificially generated examples based on captured data, for example by modifying text, graphics, and their respective positions, to make the learning process robust. In addition, publicly available data sets may also be incorporated into the training process.

The training dataset 212 may be created or trained using multiple examples of captured image/video 202 that goes through an identification for training process 210. In embodiments, the identification for training process 210 may include human evaluation and/or review of a plurality of images to identify where various data fields are and what metadata should be associated with the various data fields. Once the training data set 212 is of a predetermined size, it may be used to train the NLP 204. In embodiments, once trained, the NLP 204 may be subjected to an evaluation process (not shown) to evaluate the quality of the NLP 204 output. In embodiments, the training data set 212 may be updated on a regular basis using newly captured image/video 202. In this way, the quality of the NLP 204 output may be improved over time. In embodiments, Transformer-based techniques such as Bidirectional Encoder Representations from Transformers (BERT), a Transformer-based machine learning technique for natural language processing pre-training developed by Google™, may be used to facilitate training of the NLP 204. In other embodiments, Roberta, developed by Facebook™, or other BERT various may be used. In addition, other recurrent Neural Networks (RNN)-based techniques and/or Long Short Term Memory (LSTM) techniques may be used.

In embodiments a query function 214 may be used to query the results of the NLP 204, or query results stored in data/metadata database 206. In embodiments, the query function 214 may be a part of the user device 102, the central server 110, or some other computing device (not shown) used to identify and process the data and associated metadata on the label 106. In embodiments, the data and associated metadata may be displayed on a screen of a device, for example the customer device 102, or a remote device that may be used by a service provider in communication with customer device 102. In embodiments, the data and associated metadata may be transmitted to a technician or to a another service individual, such as via the remote device, to assist with repair of the piece of equipment. In other embodiments, the data and associated metadata may be stored in a warranty database to be associated with the customer.

Figure 3:
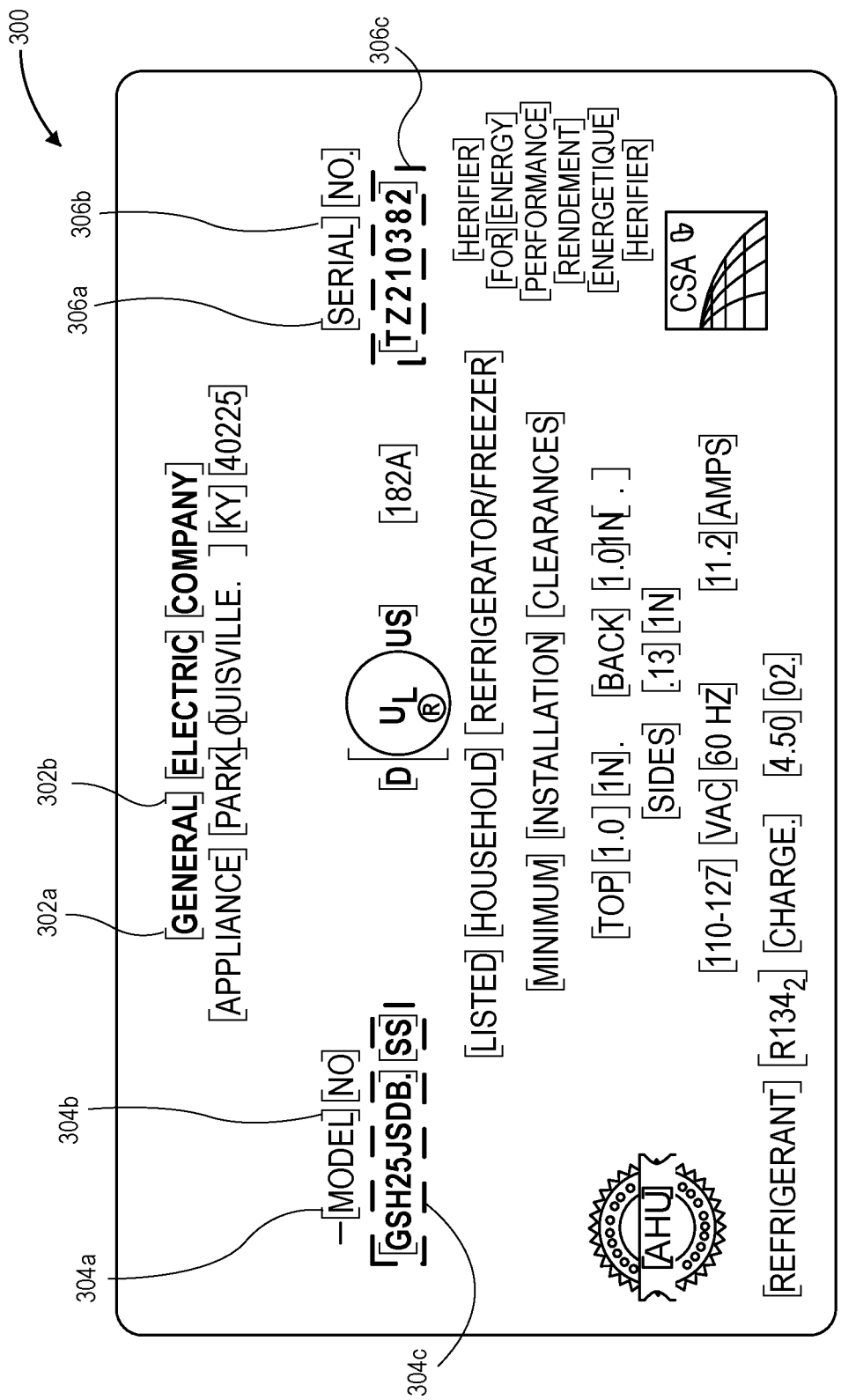
FIG. 3 is an example of an image of an identification label of a device that includes multiple fields of information to be processed by NLP, according to various embodiments.

FIG. 3 is an example of an image of an identification label of a device that includes multiple fields of information to be processed by NLP, according to various embodiments. Image 300 may be an example of captured image/video 202 that may be sent to the NLP 204. In particular, diagram 300 may be an image of a label containing equipment information 106 of FIG. 1.

In embodiments, an OCR process may be applied to the image 300 to identify text areas on the label containing equipment information 106. This OCR process may result in various fields, shown within left and right brackets in various locations on image 300. For example, the text "GENERAL" that is found between brackets 302a and 302b indicates a portion of the name of the manufacturer. It should be understood from this example that, depending upon the particulars of a given label or tag, not all data may have an explicit metadata tag or field present, e.g. "Serial no." followed by the serial number, as seen in fields 306a-c on image 300. In the case of brackets 302a and 302b, there is no corresponding metadata field of "Manufacturer" or "Brand" explicitly present in the image 300.

In another example, the identified text field 304c "GSH25JSDB SS" that is located proximate to the "MODEL" text between brackets 304a and 304b may be processed by the NLP 204 to associate the metadata "model" with the text "GSH25JSDB SS". In another example, the identified text field 306c "TZ210382" that is located proximate to the "SERIAL" text between brackets 306a and 306b may be processed by the NLP 204 to associate the metadata "serial number" with the text "TZ210382". In embodiments, the NLP 204 will perform this recognition based upon the population of the training dataset 212.

In embodiments, this training dataset 212 may include thousands of examples of text fields and associated metadata, such as those fields shown with respect to image 300, from which the NLP 204 will learn which text fields are associated with which metadata. In embodiments, additional information related to the text within various fields shown in image 300 may be used by the NLP 204 to associate metadata with data. This additional information may include, for example, relative location of the various text fields, font of the text, boldness of the text, size of the text, graphical devices associated with the text, alignment between two pieces of the text, and the like. Further, the training dataset 212 may include examples of text fields that lack an explicit metadata field or tag. Such examples may, in embodiments, be manually tagged with appropriate metadata, e.g. manufacturer, brand name, etc., so that the NLP 204 can recognize such unlabeled fields and tag them with the appropriate metadata based on the training dataset 212. Alternatively or additionally, in some such examples the missing metadata field may be obtained using an alternative analysis, e.g. by object recognition on the appearance of the appliance or device to which the tag is attached, recognition of logos or brand names, cross reference to databases, searching, or another suitable technique.

Figure 4:
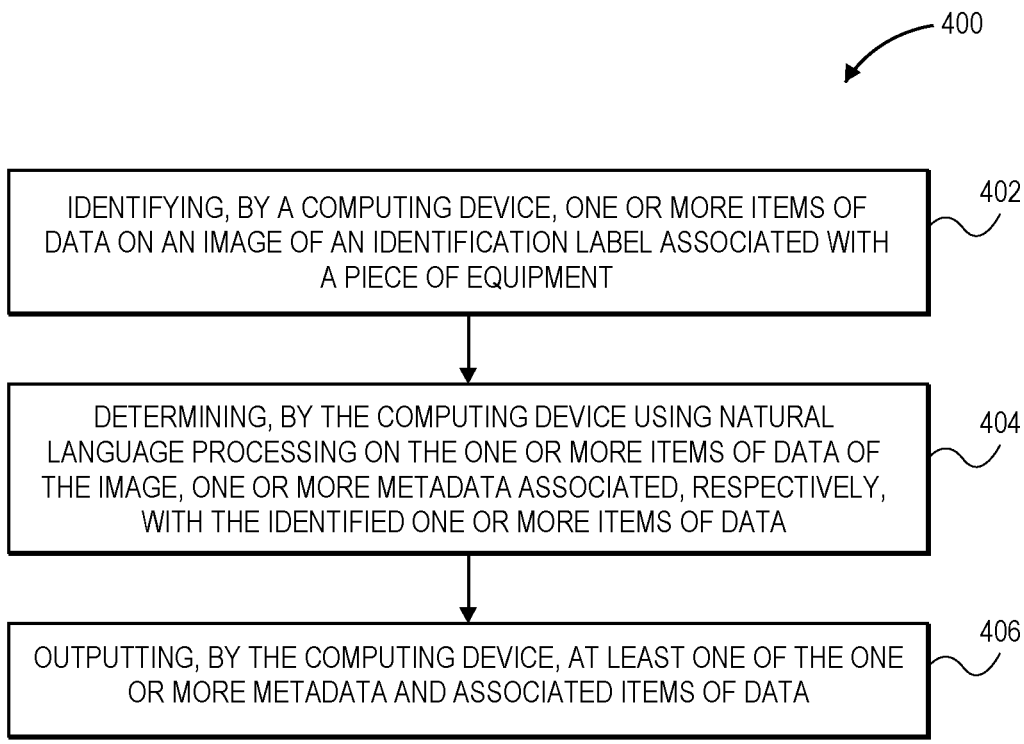
FIG. 4 is a flow chart of an example method for using NLP to identify data and associated metadata from an image of an identification label, according to various embodiments.

FIG. 4 is a flow chart of an example method 400 for using NLP to identify data and associated metadata from an image of an identification label, according to various embodiments. Method 400 may be performed, in embodiments, by a device such as consumer device 102, server 110, a combination of the consumer device 102 and the server 110, or by some other device communicatively coupled with the consumer device 112 and/or the server device 110. Method 400 may be performed in whole or in part, some operations may be omitted or additional operations added, with the operations performed in the order illustrated in FIG. 4, or in a different order to the extent feasible.

The various operations of method 400 may be implemented in whole or in part by a system, such as system 100 or system 200, or by one or more components of system 100 or 200. Various operations and/or functionality described with respect to system 100 or system 200 may be implemented with various components of system 100, such as central server 110 and consumer device 102. The selection of component(s) to perform various functions will depend upon the specific implementation. For example, in some embodiments consumer device 102 may perform many of the operations of method 400, possibly using a dedicated application or applications. In other embodiments, functionality may be implemented using central server 110, with consumer device 102 acting primarily as a data collection point, and forwarding data such as device images to central server 110 for processing. Still other embodiments may distribute various processing aspects across multiple components of system 100. In some embodiments, consumer device 102 may run a dedicated application that interfaces with central server 110. In still other embodiments, consumer device 102 may interface with central server 110 via a web browser or web browser-based interface. Method 400 may be performed at least in part by the NLP 204 and/or other components, systems, or devices shown with respect to FIGS. 1-2.

In operation 402, the method may include identifying, by a computing device, one or more items of data on an image of an identification label associated with a piece of equipment. Identification of the one or more items may include executing an OCR routine on the image of the identification label, which may be part of 202 as discussed above with respect to FIG. 2, and may be described further with respect to method 600 of FIG. 6. In embodiments, the computing device may include consumer device 102 or central server 110. The identification label may be correspond to the equipment information 106 applied as a label to the piece of equipment 107. The image of the identification label may be similar to image 300, that includes one or more items of data, for example model number 304c and serial number 306c.

In operation 404, the method may include determining, by the computing device using natural language processing on the one or more items of data of the image, one or more metadata associated, respectively, with the identified one or more items of data. In embodiments, the one or more items of data may include text that has been subjected to OCR processing. Natural language processing may be similar to NLP 204 as described above. In embodiments, the one or more items of data may include information in addition to text, including positioning information of the text, nearby graphical devices such as boxes, icons, or logos.

In operation 406, the method may include outputting, by the computing device, at least one of the one or more metadata and associated items of data. In embodiments, the output may be stored in the database/metadata database 206. In other embodiments, the output may be sent to another application, based on a query 214 by the application. In other embodiments, the output may be displayed upon a screen of a device, such as the consumer device 102, or a remote device used by a service technician, by way of example.

Figure 5:
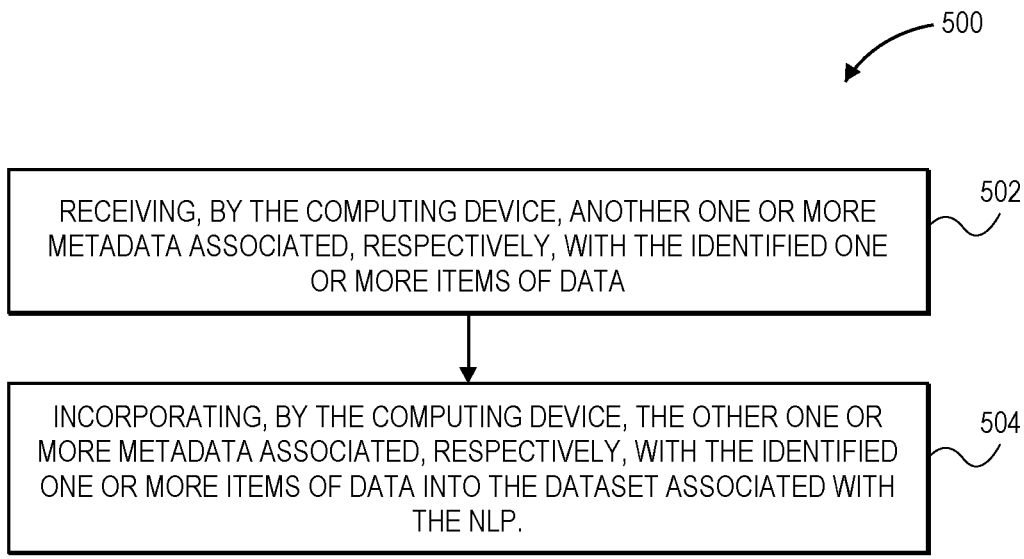
FIG. 5 is a flow chart of an example method for incorporating items of data and associated metadata into a dataset associated with the NLP, according to various embodiments.

FIG. 5 is a flow chart of an example method 500 for incorporating items of data and associated metadata into a dataset associated with the NLP, such as training dataset 212, according to various embodiments. The various operations of method 500 may be implemented in whole or in part by a system such as system 100 or system 200, or by one or more components of system 100 or 200. Various operations and/or functionality described with respect to system 100 or system 200 may be implemented with various components of system 100, such as central server 110 and consumer device 102. The selection of component(s) to perform various functions will depend upon the specific implementation. For example, in some embodiments consumer device 102 may perform many of the operations of method 500, possibly using a dedicated application or applications. In other embodiments, functionality may be implemented using central server 110, with consumer device 102 acting primarily as a data collection point, and forwarding data such as device images to central server 110 for processing. Still other embodiments may distribute various processing aspects across multiple components of system 100. In some embodiments, consumer device 102 may run a dedicated application that interfaces with central server 110. In still other embodiments, consumer device 102 may interface with central server 110 via a web browser or web browser-based interface. Method 500 may be performed at least in part by the NLP 204 and/or other components, systems, or devices shown with respect to FIGS. 1-2. Method 500 may be performed in whole or in part, some operations may be omitted or additional operations added, with the operations performed in the order illustrated in FIG. 5, or in a different order to the extent feasible.

In operation 502, the method may include receiving, by the computing device, another one or more metadata associated, respectively, with the identified one or more items of data. In embodiments, another one or more metadata associated, respectively, with the identified one or more items of data may include training data that is received from captured image/video 202. In other embodiments, these may be received from a set of data (not shown) to be eventually incorporated within the training data set 212, which may then be used to train the NLP 204. In other embodiments, selected examples of captured image/video 202 during customer use may be chosen to be included as examples for the training data set 212.

In operation 504, the method may include incorporating, by the computing device, the other one or more metadata associated, respectively, with the identified one or more items of data into the dataset associated with the NLP. In embodiments, the data set associated with the NLP may correspond to the training data set 212. In embodiments, incorporating may include applying the process of identification for training 210. This process may include human interaction to associate one or more metadata with one or more items of data to be incorporated in the training data set 212. In embodiments, after the training data set 212 is updated, the NLP 204 may retrain itself on a regular basis using the training data set 212. In this way, the quality of the NLP 204 results will increase over time during usage.

FIG. 6 depicts the operations for an example method 600 for automatic detection and recognition of visual tags containing equipment or product information. The various operations of method 600 may be implemented in whole or in part by system 100, or by one or more components of system 100. Various operations and/or functionality may be implemented with various components of a system such as system 100, and on devices such as central server 110 and consumer device 102. The selection of component(s) to perform various functions will depend upon the specific implementation. For example, in some embodiments consumer device 102 may perform many of the operations of method 600, possibly using a dedicated application or applications. In other embodiments, functionality may be implemented using central server 110, with consumer device 102 acting primarily as a data collection point, and forwarding data such as device images to central server 110 for processing. Central server 110 may provide object processing, recognition and/or look up services, such as will be described further below. Still other embodiments may distribute various processing aspects across multiple components of system 100. In some embodiments, consumer device 102 may run a dedicated application that interfaces with central server 110. In still other embodiments, consumer device 102 may interface with central server 110 via a web browser or web browser-based interface. Method 600 may be performed in whole or in part, some operations may be omitted or additional operations added, with the operations performed in the order illustrated in FIG. 6, or in a different order to the extent feasible.

Starting with operation 602, the location of information about an object such as a device, appliance, or other piece of equipment is initially determined. In some embodiments, a consumer device, such as consumer device 102 via camera 104, is used to capture an image of the object, which is then analyzed to determine one or more specific aspects of the object. One or more object recognition algorithms may be used in analysis, to extract features such as overall shape, shape and position of features such as handles, knobs, burners, doors, faucets, dispensers, controls, displays, logos or brands, model names/line names, etc. These aspects, in turn, may be used to determine preliminary information about the object, such as object type (e.g. dishwasher, refrigerator, range, television, cell phone), and possibly make (e.g. GE, Whirlpool, Apple, Samsung) and model (e.g. Adora, Profile, Galaxy, iPhone). The preliminary information may then be used by an implementing system to search into one or more databases to determine a likely make and/or model of the object.

With one or more of these aspects identified, an implementing system, such as system 100, may be able to provide preliminary information to a user about the location of the equipment information. For example, if it is determined that the device is a Whirlpool refrigerator, the implementing system may reference information about Whirlpool refrigerators that indicates that the equipment information is typically located inside the refrigeration compartment on the sidewall. Similarly, if it is determined that the device is a Kitchen Aid dishwasher, the system may indicates that the equipment information is on the frame of the dishwasher, just inside the door. Such information may be determined by referencing a database, such as may be provided by a central server 110; by referencing an Internet search, which may be carried out by a central server or consumer device; or by another suitable technique or process to obtain equipment information location.

In instances where the make and/or model of an object is not known and the user of the consumer device is also not aware of the make and/or model, likely locations for equipment information may be provided based upon the type of object. For example, where the object is a refrigerator but the make and model is not otherwise known, or where specific information about the location of the equipment information is not available, then the user may be instructed to check inside the refrigerator compartment, on the inside of the door, on the side of the unit, etc., or other likely locations for the equipment information. Such uncertainty can be passed to subsequent operations to allow for further object detection to verify that the equipment information has been located.

In some cases, depending upon the manufacturer, not only the type of object (e.g. refrigerator, cell phone), but also the model or model line may be determined (e.g. GE Profile series, Apple iPhone) from the exterior appearance of the object. In other cases, the manufacturer may not be readily determined. For example, some dishwashers that use top controls may present a front that is substantially a featureless rectangle, save for a handle. Such an appearance may be presented by models from a number of different manufacturers, making determining a particular manufacturer, let alone a specific model or even model line, infeasible. The consumer device, such as consumer device 102, may be configured to prompt the user in such cases to indicate a manufacturer and/or model. In some examples, indicating the manufacturer may then enable determination of the specific model. In other examples, both the manufacturer and model may need to be manually entered by a user. In such examples, the implementing system, such as system 100, may forego object recognition/analysis of the object, and instead use the user-suppled information to look up where the equipment information is to be found. In still other embodiments, the exterior appearance of the object may be sufficient to allow a subset of possible manufacturers and/or models to be presented, from which the user may select.

Following determining the location of the object or the equipment information, the user may be presented with instructions or guidance about where to locate the equipment information. Such instructions may include a general depiction of the layout of the equipment information, along with specific highlighting of the equipment information location relative to the appearance of the object. In some embodiments, the location of the equipment information may be indicated with respect to the particular perspective of the user, determined as the perspective of the consumer device. In still further embodiments the perspective may be indicated using a captured image of the object, which may be an image captured by the consumer device. Alternatively or additionally, the location of the equipment information may be presented in an augmented reality (AR) format overlaid on a video feed of the object, such as may be captured by a camera on the consumer device, with the location indicia or highlighting anchored to its location in a video feed, as may be understood in AR techniques. In some examples, AR instructions may be supplied to the user to access the location of the equipment information, such as where the location is not immediately visible, e.g. a door or access hatch must be opened, the object must be turned around or turned over, etc. Instructions may be presented using AR cues, such as arrows or actions indicating a panel or door to be opened, a latch to be unlocked, etc. Where the make and/or model of the object are known, the user may further be supplied with a picture or representation of the equipment information, so that the user can be aware of what to look for.

In still other scenarios, the user may already know the location of the equipment information. In such a scenario, the user may opt to skip identification from a picture of the object and simply take a photo of the equipment information directly. In some embodiments, the user may also be prompted to tell the implementing system, such as a system 100, about the object's make and model to allow system 100 to more accurately process the photo of the equipment information. In such an embodiment, operations 602 and 604 may effectively be skipped or omitted.

In operation 604, once the location of the equipment information has been accessed, object recognition may be employed to locate the actual tag, panel, or informational area containing the equipment information. As mentioned above, the shape of the equipment information may be presented to the user so that the user knows towards what to direct the capturing device, e.g., camera on the consumer device. This shape can also be used, in embodiments, as an input into an object recognition algorithm (such as may be run by a consumer device 102, central server 110, or both, or another device), to accurately locate the actual equipment information. Some implementations may use visual cues presented on the consumer device to allow a user to quickly match the shape of the equipment information placard, decal, or other area, such as by portraying a silhouette of the equipment information shape on a display, thus allowing a user to simply match up shapes.

Following object recognition in operation 604 and/or confirmation of the correct location of the equipment information, in operation 606 the image of the equipment information from a capture device, such as a camera 104, may be analyzed to extract the relevant information. In some embodiments, this information may be extracted using an optical character recognition (OCR) routine, which are widely known in the prior art and will not be discussed in detail here.

The resulting strings of recognized characters and symbols is then parsed in operation 608, and the relevant information is extracted from the equipment information. In examples, the relevant information comprises at least the model number and serial number of the object. Relevant information may be any information that allows further information about the identified object (appliance, device, etc.) to be referenced, such as service manuals, instruction manuals, warranty information, service bulletins, recall notices, etc. The details of this step will be described in greater detail below with respect to method 700.

Finally, in operation 610, the extracted information from operation 608 is used to determine appropriate service information about the object or device. Such information may include user's or operator's manual(s), service or shop manual(s), service bulletins, informational postings, chat threads, etc., and/or any other information that may be used to operate and/or service the object or device. Such information may then be provided to the user, and may further be presented to the user upon a consumer device, such as consumer device 102. In other examples, a professional may be in communication with the user, such as via consumer device 102 in communication with system 100, possibly through central server 110, and the professional may also/instead be presented with the appropriate service information to assist the user in repairing, servicing, or otherwise operating the object. The implementing system may include a repository of appropriate manuals and other related or similar literature, and/or may be able to obtain such information via the Internet, such as directly from the object manufacturer, or other source of information.

FIG. 7 depicts the operations for an example method 700 for parsing and extracting relevant information from a captured equipment information. Relevant information, in particular, relevant identifying information, may be used to locate additional information and resources about the identified object, as discussed above. Method 700 may be executed as a part of operation 608 of method 600. Method 700 thus may be carried out, in embodiments, in whole or in part via one or more components of system 100, as with method 600. It should be appreciated that method 600 and method 700 may be carried out as a continuous sequence of steps. The separation of method 700 into a separate flow chart is done only for illustrative purposes, and is not intended to be limiting or otherwise suggest that method 700 must be carried out separately or independently from method 600. Moreover, some operations of method 700 may not need to be performed, for example where manufacturer and model information are positively determined, such as by object recognition in operation 202 and/or by direct input from a user, such as through consumer device 102. Depending upon the information available to an implementing system, such as system 100 through operations 602 to 606, only one or two operations of method 700 may be necessary, with other operations only relevant where information about the layout of the equipment information is unavailable. Method 700 may be performed in whole or in part, some operations may be omitted or additional operations added, with the operations performed in the order illustrated in FIG. 7, or in a different order to the extent feasible.

In operation 702, information following performing OCR upon the equipment information in operation 606, data from OCR is received and first parsed to locate manufacturer information, either to confirm that a detected manufacturer is correct, or to ascertain the manufacturer where the manufacturer is not known. OCR and object recognition upon the equipment information may allow for detection of logos or insignia indicating the manufacturer, in addition or alternatively to parsing the information and looking for particular manufacturer names. Determining the manufacturer name may also allow feed into subsequent operations to allow method 700 to be performed more accurately and/or efficiently, with foreknowledge of the likely layout of the equipment information.

In operation 704, the layout of the equipment information is determined. As mentioned above, the layout may be obtained by detecting the manufacturer and/or the model of the object, or via such information being supplied by a user, which can then be used to look up, such as over the Internet or in a database, such as may be offered by central server 110, potential layout or layouts for the equipment information. Such layouts may indicate the relative location(s) of relevant information in the equipment information, allowing more accuracy in subsequent extraction of relevant information from non-relevant information.

Once the layout is known, in operation 706 pattern recognition may be used to extract the relevant information, such as model number, serial number, manufacture date, revision, operating specifications (e.g. voltage/current requirements, operating parameters such as temperature and speed, etc.). The layout may indicate where, in a two-dimensional pattern of text obtained from an image of the equipment information, these various text fields may be located, as opposed to field labels or other non- or less-relevant information, such as manufacturer contact information, disclaimers, certification marks, etc. This information may then be extracted from the data resulting from OCR, and in turn used to obtain necessary service and/or operation information, as discussed above.

In some embodiments, pattern recognition may be employed despite the layout of the equipment information not being known. In such embodiments, the particular sequences of letters and/or numbers may indicate model, serial number, and other relevant information. For example, where the manufacturer of a product is known, the manufacturer may follow a consistent scheme in model and serial numbers, such that system 100 can use the known scheme to determine which text in an the equipment information is a model number, a serial number, manufacturing date, etc.

In operation 708, additionally or alternatively, image context may be used, possibly in conjunction with pattern recognition in operation 706. Image context may include the presence of words such as "model", "serial", "s/n", "date", "specifications", and similar such words that may be found in an equipment information. Contextual extraction may be useful where the make and model of an object is unknown, and so the layout of the equipment information is not otherwise known. For example, the presence of the words "serial no." followed by or proximate to a string of numbers and/or letters may allow an implementing system, such as system 100, to conclude that the string of numbers and/or letters is likely to be a serial number. Such information may, in some embodiments, be presented to the user for confirmation, particularly where the layout leaves some room for ambiguity in a context-driven recognition algorithm.

It should be understood that the various operations of method 600 and/or method 700 may be performed at the same time, or at different times. Moreover, the various operations may be performed by different components of an implementing system, such as system 100, or some operations may be carried out by multiple components of the system, with each component carrying out distinct aspects of a given operation. In some embodiments, a consumer device 102 may execute an app that implements one or more operations of methods 600 and/or 700, including directly performing searches across the Internet, without the need to interface with a central server 110. In other embodiments, a central server 110 may provide some, all, or substantially all of the functionality for one or more operations of methods 600 and/or 700.

Figure 8:
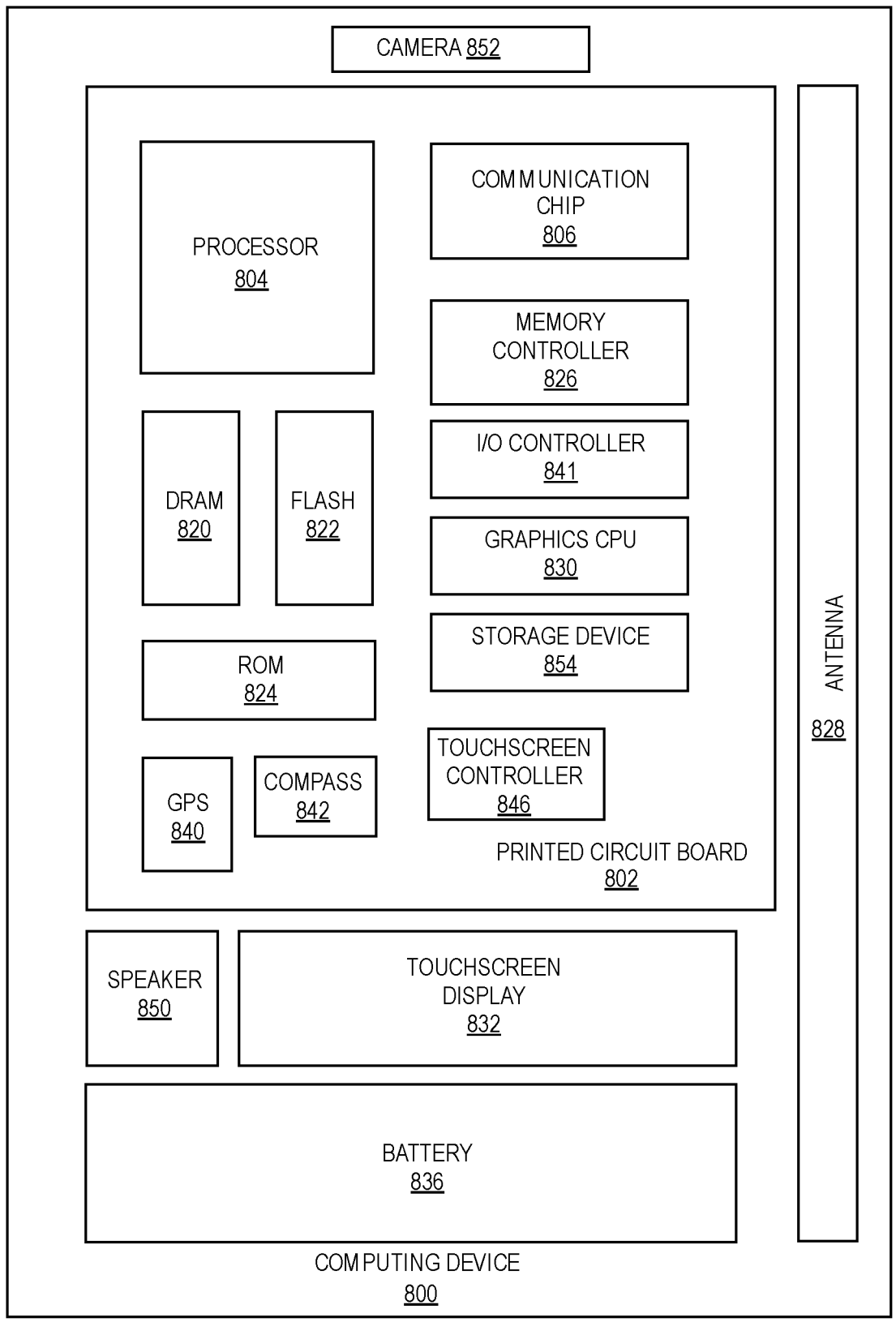
FIG. 8 is a block diagram of an example computer that can be used to implement some or all of the components of the system of FIG. 1, according to various embodiments.

FIG. 8 illustrates an example computer device 800 that may be employed by the apparatuses and/or methods described herein, in accordance with various embodiments. As shown, computer device 800 may include a number of components, such as one or more processor(s) 804 (one shown) and at least one communication chip 806. In various embodiments, the one or more processor(s) 804 each may include one or more processor cores. In various embodiments, the one or more processor(s) 804 may include hardware accelerators to complement the one or more processor cores. In various embodiments, the at least one communication chip 806 may be physically and electrically coupled to the one or more processor(s) 804. In further implementations, the communication chip 806 may be part of the one or more processor(s) 804. In various embodiments, computer device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computer device 800 may include other components that may be physically and electrically coupled to the PCB 802. These other components may include, but are not limited to, memory controller 826, volatile memory (e.g., dynamic random access memory (DRAM) 820), non-volatile memory such as read only memory (ROM) 824, flash memory 822, storage device 854 (e.g., a hard-disk drive (HDD)), an I/O controller 841, a digital signal processor (not shown), a crypto processor (not shown), a graphics processor 830, one or more antennae 828, a display, a touch screen display 832, a touch screen controller 846, a battery 836, an audio codec (not shown), a video codec (not shown), a global positioning system (GPS) device 840, a compass 842, an accelerometer (not shown), a gyroscope (not shown), a speaker 850, a camera 852, and a mass storage device (such as hard disk drive, a solid state drive, compact disk (CD), digital versatile disk (DVD)) (not shown), and so forth.

In some embodiments, the one or more processor(s) 804, flash memory 822, and/or storage device 854 may include associated firmware (not shown) storing programming instructions configured to enable computer device 800, in response to execution of the programming instructions by one or more processor(s) 804, to practice all or selected aspects of the system 100 and method 200 described herein. In various embodiments, these aspects may additionally or alternatively be implemented using hardware separate from the one or more processor(s) 804, flash memory 822, or storage device 854.

The communication chips 806 may enable wired and/or wireless communications for the transfer of data to and from the computer device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computer device 800 may be a laptop, a netbook, a notebook, an ultrabook, a smartphone, a computer tablet, a personal digital assistant (PDA), a desktop computer, smart glasses, or a server. In further implementations, the computer device 800 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computer 800, in response to execution of the programming instructions, to implement (aspects of) system 100, system 200, method 400, method 500, method 600, and/or method 700. In alternate embodiments, programming instructions 904 may be disposed on multiple computer-readable non-transitory storage media 902 instead. In still other embodiments, programming instructions 604 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

EXAMPLES

Example 1 is a method comprising: identifying, by a computing device, one or more items of data on an image of an identification label associated with a piece of equipment; determining, by the computing device using natural language processing (NLP) on the one or more items of data of the image, one or more metadata associated, respectively, with the identified one or more items of data; and outputting, by the computing device, at least one of the one or more metadata and associated items of data.

Example 2 may include the method of example 1, wherein an item of data includes text.

Example 3 may include the method of example 1, wherein an item of data includes an indication of a location of the item of data with respect to the identification label.

Example 4 may include the method of example 1, wherein one or more metadata further includes a selected one of: a serial number of the piece of equipment, a model number of the piece of equipment, a part number of the piece of equipment, a rating of the piece of equipment, a manufacturing date of the piece of equipment, a manufacturing location of the piece of equipment, installation instructions for the piece of equipment, operating instructions for the piece of equipment, dimensions of the piece of equipment, and/or power requirements of the piece of equipment.

Example 5 may include the method of example 1, wherein the NLP is associated with a dataset based upon a plurality of items of data associated with a plurality of identification labels associated with a plurality of pieces of equipment, wherein the dataset is used to train the NLP.

Example 6 may include the method of example 5, further comprising: after outputting, receiving, by the computing device, another one or more metadata associated, respectively, with the identified one or more items of data; and incorporating, by the computing device, the other one or more metadata associated, respectively, with the identified one or more items of data into the dataset associated with the NLP.

Example 7 may include the method of example 6, wherein the received other one or more metadata associated, respectively, with the identified one or more items of data is based on a review of the one or more metadata associated, respectively, with the identified one or more items of data.

Example 8 may include the method of example 7, wherein the review is performed by a human.

Example 9 may include the method of example 1, wherein identifying the one or more data items further includes applying optical character recognition (OCR) to the image of the identification label.

Example 10 may include the method of example 1, wherein two or more items of data are associated with a metadata.

Example 11 may include the method of example 10, wherein the two or more items of data are on different regions of the identification label.

Example 12 may include the method of example 1, wherein an item of data includes a graphic device.

Example 13 may include the method of example 1, further comprising capturing, by the computing device, the image of the identification label associated with the piece of equipment.

Example 14 is an apparatus comprising: one or more computer processors; memory coupled with the one or more computer processors, the memory storing instructions that, when executed by the one or more computer processors, cause the apparatus to: identify one or more items of data on an image of an identification label associated with a piece of equipment; determine, using natural language processing (NLP) on the one or more items of data of the image, one or more metadata associated, respectively, with the identified one or more items of data; and output at least one of the one or more metadata and associated items of data.

Example 15 may include the apparatus of example 14, wherein the NLP is associated with a dataset based upon a plurality of items of data associated with a plurality of identification labels associated with a plurality of pieces of equipment, wherein the dataset is used to train the NLP.

Example 16 may include the apparatus of example 15, further comprising: after outputting, receiving, by the computing device, another one or more metadata associated, respectively, with the identified one or more items of data; and incorporating, by the computing device, the other one or more metadata associated, respectively, with the identified one or more items of data into the data set of the NLP for future training.

Example 17 may include the apparatus of example 16, wherein to receive the other one or more metadata associated, respectively, with the identified one or more items of data is based on a review of the one or more metadata associated, respectively, with the identified one or more items of data.

Example 18 may include the apparatus of example 17, wherein the review is performed by a human.

Example 19 may include the apparatus of example 14, wherein to identify the one or more data items further includes to apply optical character recognition (OCR) to the image of the identification label.

Example 20 may include the apparatus of example 14, wherein two or more items of data are associated with a metadata.

Example 21 may include the apparatus of example 20, wherein the two or more items of data are on different regions of the identification label.

Example 22 may include the apparatus of example 14, wherein the apparatus is a mobile computing device.

Example 23 may include the apparatus of example 22, wherein the apparatus further includes an image capturing device coupled with the one or more processors, and wherein the instructions are further to cause the apparatus to capture the image using the image capturing device.

Example 24 may include the apparatus of example 23, wherein the image capturing device is a camera.

Example 25 may include the apparatus of example 14, wherein the apparatus is a server computing device.

Example 26 may be a system comprising: an image capturing device; and a server computing device communicatively coupled with the image capturing device, the server including: one or more computer processors; memory coupled with the one or more computer processors, the memory storing instructions that, when executed by the one or more computer processors, cause the server to: identify one or more items of data on an image of an identification label associated with a piece of equipment; determine, using natural language processing (NLP) on the one or more items of data of the image, one or more metadata associated, respectively, with the identified one or more items of data; and output at least one of the one or more metadata and associated items of data.

Example 27 may include the system of example 26, wherein the NLP is associated with a dataset, the dataset based upon a plurality of items of data associated with a plurality of identification labels associated with a plurality of pieces of equipment, and wherein the dataset is used to train the NLP.

Example 28 may include the system of example 27, wherein the server includes the dataset.

Example 29 may include the system of example 27, the instructions further causing the system to: receive another one or more metadata associated, respectively, with the identified one or more items of data; and incorporate the received other one or more metadata associated, respectively, with the identified one or more items of data into the dataset associated with the NLP.

Example 30 may include the system of example 26, wherein an item of data includes text.

Example 31 may include the system of example 26, wherein an item of data includes an indication of a location of the item of data with respect to the identification label.

Example 32 may include the system of example 26, wherein one or more metadata further includes a selected one of: a serial number of the piece of equipment, a model number of the piece of equipment, a part number of the piece of equipment, a rating of the piece of equipment, a manufacturing date of the piece of equipment, a manufacturing location of the piece of equipment, installation instructions for the piece of equipment, operating instructions for the piece of equipment, dimensions of the piece of equipment, and/or power requirements of the piece of equipment.

The invention claimed is:

1. A method comprising:
   identifying, by a computing device, one or more items of data on an image of an identification label associated with a piece of equipment;
   determining, by the computing device using natural language processing (NLP) on the one or more items of data of the image, one or more metadata associated, respectively, with the identified one or more items of data; and
   outputting, by the computing device, at least one of the one or more metadata and associated items of data.

2. The method of claim 1, wherein an item of data includes text.

3. The method of claim 1, wherein an item of data includes an indication of a location of the item of data with respect to the identification label.

4. The method of claim 1, wherein one or more metadata further includes a selected one of: a serial number of the piece of equipment, a model number of the piece of equipment, a part number of the piece of equipment, a rating of the piece of equipment, a manufacturing date of the piece of equipment, a manufacturing location of the piece of equipment, installation instructions for the piece of equipment, operating instructions for the piece of equipment, dimensions of the piece of equipment, and/or power requirements of the piece of equipment.

5. The method of claim 1, wherein the NLP is associated with a dataset based upon a plurality of items of data associated with a plurality of identification labels associated with a plurality of pieces of equipment, wherein the dataset is used to train the NLP.

6. The method of claim 5, further comprising:
after outputting, receiving, by the computing device, another one or more metadata associated, respectively, with the identified one or more items of data; and
incorporating, by the computing device, the another one or more metadata associated, respectively, with the identified one or more items of data into the dataset associated with the NLP.

7. The method of claim 6, wherein the received other one or more metadata associated, respectively, with the identified one or more items of data is based on a review of the one or more metadata associated, respectively, with the identified one or more items of data.

8. The method of claim 1, wherein identifying the one or more data items further includes applying optical character recognition (OCR) to the image of the identification label.

9. The method of claim 1, wherein two or more items of data are associated with a metadata.

10. An apparatus comprising:
one or more computer processors;
memory coupled with the one or more computer processors, the memory storing instructions that, when executed by the one or more computer processors, cause the apparatus to:
identify one or more items of data on an image of an identification label associated with a piece of equipment;
determine, using natural language processing (NLP) on the one or more items of data of the image, one or more metadata associated, respectively, with the identified one or more items of data; and
output at least one of the one or more metadata and associated items of data.

11. The apparatus of claim 10, wherein the NLP is associated with a dataset based upon a plurality of items of data associated with a plurality of identification labels associated with a plurality of pieces of equipment, wherein the dataset is used to train the NLP.

12. The apparatus of claim 11, further comprising:
after outputting, receiving, by the computing device, another one or more metadata associated, respectively, with the identified one or more items of data; and
incorporating, by the computing device, the another one or more metadata associated, respectively, with the identified one or more items of data into a data set of the NLP for future training.

13. The apparatus of claim 12, wherein to receive the other one or more metadata associated, respectively, with the identified one or more items of data is based on a review of the one or more metadata associated, respectively, with the identified one or more items of data.

14. The apparatus of claim 10, wherein to identify the one or more data items further includes to apply optical character recognition (OCR) to the image of the identification label.

15. The apparatus of claim 10, wherein two or more items of data are associated with a metadata.

16. The apparatus of claim 10, wherein the apparatus is a mobile computing device.

17. The apparatus of claim 16, wherein the apparatus further includes an image capturing device coupled with the one or more processors, and wherein the instructions are further to cause the apparatus to capture the image using the image capturing device.

18. A system comprising:
an image capturing device;
a server computing device communicatively coupled with the image capturing device, the server including:
one or more computer processors;
memory coupled with the one or more computer processors, the memory storing instructions that, when executed by the one or more computer processors, cause the server to:
identify one or more items of data on an image of an identification label associated with a piece of equipment;
determine, using natural language processing (NLP) on the one or more items of data of the image, one or more metadata associated, respectively, with the identified one or more items of data; and
output at least one of the one or more metadata and associated items of data.

19. The system of claim 18, wherein the NLP is associated with a dataset, the dataset based upon a plurality of items of data associated with a plurality of identification labels associated with a plurality of pieces of equipment, and wherein the dataset is used to train the NLP.

20. The system of claim 18, wherein one or more metadata further includes a selected one of: a serial number of the piece of equipment, a model number of the piece of equipment, a part number of the piece of equipment, a rating of the piece of equipment, a manufacturing date of the piece of equipment, a manufacturing location of the piece of equipment, installation instructions for the piece of equipment, operating instructions for the piece of equipment, dimensions of the piece of equipment, and/or power requirements of the piece of equipment.

* * * * *